United States Patent [19]

Kuwabara et al.

[11] Patent Number: 4,587,270

[45] Date of Patent: May 6, 1986

[54] PRELIMINARILY FOAMED PARTICLES OF NON-CROSSLINKED POLYPROPYLENE-TYPE RESIN

[75] Inventors: Hideki Kuwabara, Hadano; Yoshimi Sudo, Chigasaki, both of Japan

[73] Assignee: Japan Styrene Paper Corporation, Tokyo, Japan

[21] Appl. No.: 673,917

[22] Filed: Nov. 21, 1984

[30] Foreign Application Priority Data

Nov. 21, 1983 [JP] Japan .................................. 58-219134

[51] Int. Cl.[4] .................................................. C08J 9/22
[52] U.S. Cl. .......................................... 521/58; 521/56; 521/60; 521/144
[58] Field of Search ................................ 521/56, 60, 58

[56] References Cited

U.S. PATENT DOCUMENTS 4,379,859 4/1983 Hirosawa et al. ...................... 521/60
4,399,087 8/1983 Akiyama et al. ...................... 521/60
4,415,680 11/1983 Ushirokawa et al. ................ 521/60
4,436,840 3/1984 Akiyama et al. ...................... 521/60
4,448,901 5/1984 Senda et al. .......................... 521/56
4,464,484 8/1984 Yoshimura et al. .................. 521/56
4,504,601 3/1985 Kuwabara et al. .................... 521/60

Primary Examiner—Morton Foelak
Attorney, Agent, or Firm—Sherman and Shalloway

[57] ABSTRACT

Preliminarily foamed particles of a non-crosslinked polypropylene resin based on an alpha-olefin/propylene random copolymer having an amount of the heat of crystallization in the range of 5 to 15 cal/g, said preliminarily foamed particles having such a crystal structure that when a DSC curve is drawn by means of a differential scanning calorimeter, by heating 1 to 3 mg of the preliminarily foamed particles to 220° C. at a rate of 10° C./min., a high temperature peak is observed at a higher temperature than the temperature of the peak inherent to the base resin.

5 Claims, 3 Drawing Figures

PRELIMINARILY FOAMED PARTICLES OF NON-CROSSLINKED POLYPROPYLENE-TYPE RESIN

This invention relates to preliminarily foamed particles of a non-crosslinked polypropylene-type resin.

"Bead-foamed molded articles" obtained by filling preliminarily foamed particles in a mold and foaming them under heat (to be referred to hereinbelow sometimes as an "in-mold article" or simply a "molded article") have excellent cushioning properties and heat insulating properties and have been widely used as cushioning materials, packaging materials, heat insulating materials, building materials, etc. The demand for these molded articles has ever been increasing in recent years.

In-mold articles from preliminary foamed particles of polystyrene have been known previously, but it has still been desired to improve them because they have the serious defect of brittleness and also have poor chemical resistance. To eliminate these defects, in-mold articles from preliminarily foamed particles of crosslinked polyethylene were proposed. From the preliminarily foamed particles of crosslinked polyethylene, however, it is difficult to obtain molded articles of a low density (a high expansion ratio) by foaming in a mold. An attempt to make a molded article of a low density therefrom has only resulted in a product having a high shrinkage, a high water absorption and poor properties, which is far from being satisfactory for practical applications. Furthermore, since the unreacted crosslinking agents or the decomposition residues of the crosslinking agents remain in the preliminarily foamed particles of crosslinked polyethylene, they are hygienically undesirable as materials for molding food containers.

The present inventors noted the excellent properties of polypropylene-type resins, and have made investigations on in-mold articles from preliminarily foamed particles of non-crosslinked polypropylene-type resins in order to overcome the defects of conventional in-mold articles.

The preliminarily foamed particles of non-crosslinked polypropylene-type resins sometimes give in-mold articles having a low density (high expansion ratio), a low water absorption and excellent dimensional stability with a low shrinkage, but sometimes only give products having a high shrinkage. Thus, they do not stably and consistently give in-mold articles of good quality. Furthermore, even in-mold articles of good quality do not have entirely satisfactory suppleness and impact strength. In addition, conventional foamed particles of non-crosslinked polypropylene-type resins require high temperatures for their molding, and moreover, the molding is not easy. Accordingly, there is still room for improvement on the molding of the preliminarily foamed particles of non-crosslinked polypropylene-type resins.

It is an object of this invention to resolve these problems.

Extensive investigations of the present inventors have led to the discovery that preliminarily foamed particles of a non-crosslinked polypropylene-type resin based on an alpha-olefin/propylene random copolymer having a specific amount of the heat of crystallization and such a crystal structure that a specific high temperature peak appears in a DSC curve obtained by differential scanning calorimetry can be molded more easily at lower molding temperatures than in the prior art to give in-mold articles having good quality.

Thus, the present invention provides preliminarily foamed particles of a non-crosslinked polypropylene resin based on an alpha-olefin/propylene random copolymer having an amount of the heat of crystallization in the range of 5 to 15 cal/g, said preliminarily foamed particles having such a crystal structure that when a DSC curve is drawn by heating 1 to 3 mg of the preliminarily foamed particles to 220° C. at a rate of 10° C./min. by means of a differential scanning calorimeter, a high temperature peak is observed at a higher temperature than the temperature of the peak inherent to the base resin.

The present invention will now be described in detail with reference to the accompanying drawings in which.

Figure 1:
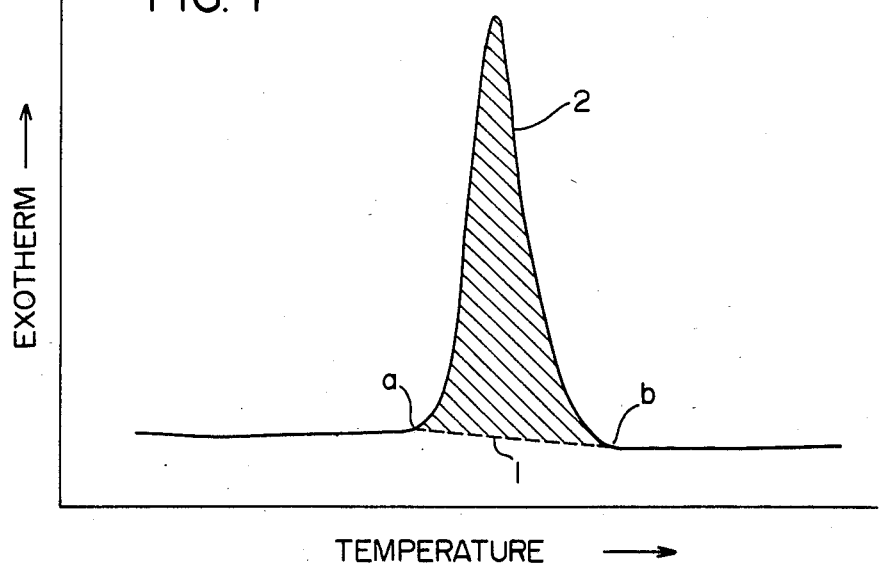
FIG. 1 is a graph showing the method of determining the amount of the heat of crystallization of the base resin on the basis of the DSC curve of the base resin.

The preliminarily foamed particles of a non-crosslinked polypropylene-type resin of this invention is derived from a non-crosslinked alpha-olefin/propylene random copolymer having an amount of the heat of crystallization, determined by differential scanning calorimetry, of 5 to 15 cal/g as a base resin. The amount of the heat of crystallization is the heat generation energy which is required for the crystallization of an alpha-olefin/propylene random copolymer in the molten state and measured when about 6 to 8 mg of the random copolymer is heated from room temperature to 220° C. at a rate of 10° C./min. by using a differential scanning calorimeter and then cooled to about 50° C. at a rate of 10° C./min. The amount of the heat of crystallization can be obtained from the area of a portion surrounded by a straight line 1 connecting points a and b and a peak 2 in the DSC curve shown in FIG. 1 (the hatched portion in FIG. 1). If the amount of the heat of crystallization of the alpha-olefin/propylene random copolymer exceeds 15 cal/g, the preliminarily foamed particles of the random copolymer as a base resin has poor low temperature moldability, and the finally obtained in-mold article has reduced suppleness and impact strength. If it is less than 5 cal/g, the in-mold article undesirably shows great dimensional changes upon heating.

Examples of the alpha-olefin constituting the base resin of the preliminarily foamed particles of this invention are 1-butene, 1-pentene and 1-hexene, 1-butene being preferred. The alpha-olefin/propylene random copolymer is produced by copolymerizing the alpha-olefin with propylene by using a titanium-containing polymerization catalyst, or a vanadium-containing polymerization catalyst. Random copolymers produced by using the vanadium-containing polymerization catalyst are preferred because their preliminarily foamed particles have better moldability at low temperatures. The alpha-olefin/propylene random copolymer used in this invention contains not more than 50 mole% of the alpha-olefin component. In the case of alpha-olefin/propylene random copolymers produced by using vanadium-containing polymerization catalysts, such as 1-butene/propylene random copolymer, the proportion of the 1-butene component is preferably 15 to 40 mole% in order for the copolymer to have an amount of the heat of crystallization of 5 to 15 cal/g.

The preliminarily foamed particles of this invention are obtained by foaming the alpha-olefin/propylene random copolymer as a base resin, and have a crystal structure characterized by the fact that when a DSC curve of the copolymer is drawn on the basis of differential scanning calorimetry, a high temperature peak appears at a higher temperature than the temperature of the peak inherent to the base resin. The DSC curve is obtained when 1 to 3 mg of the preliminarily foamed particles of the polypropylene-type resin are heated to 220° C. at a rate of 10° C./min. by a differential scanning calorimeter.

The high temperature peak in the DSC curve can be distinguished from the inherent peak by the following method. A DSC curve obtained when the sample is heated from room temperature to 220° C. at a rate of 10° C. is designated a first DSC curve. Then, a DSC curve obtained when the sample is cooled from 220° C. to about 40° C. at a rate of 10° C./min. and again heated to 220° C. at a rate of 10° C./min. is designated a second DSC curve. The peak inherent to the polypropylene-type resin as a base resin is due to endotherm during the melting of the polypropylene-type resin, and generally appears both in the first DSC curve and the second DSC curve. The inherent peak temperature may slightly differ between the first DSC curve and the second DSC curve, but the difference is less than 5° C., usually less than 3° C.

On the other hand, the high temperature peak as referred to in the present invention is an endothermic peak which appears on the high temperature side of the inherent peak in the first DSC curve. Preliminarily foamed particles of the non-crosslinked polypropylene-type resin which do not show this high temperature peak in their DSC curve have poor moldability in a mold and cannot give molded articles of good quality.

The high temperature peak is presumably due to the presence of a crystal structure which differs from the structure attributed to the above inherent peak. In fact, the high temperature peak appears in the first DCS curve, but does not appear in the second DSC curve obtained by heating the sample under the same conditions. Accordingly, the structure attributed to the high temperature peak is possessed by the preliminarily foamed particles of the polypropylene-type resin of this invention.

Desirably, there is a large difference between the temperature of the inherent peak which appears in the second DSC curve and the temperature of the high temperature peak which appears in the first DSC curve. The difference is desirably at least 5° C., preferably at least 10° C.

The preliminarily foamed particles of the non-crosslinked polypropylene-type resin of this invention can be produced, for example, by a process which comprises charging a closed vessel with 100 parts by weight of particles of a polypropylene-type resin (for example, particles of an alpha-olefin/propylene resin), 100 to 400 parts by weight of water, 5 to 30 parts by weight of a volatile blowing agent such as dichlorodifluoromethane, and 0.1 to 3 parts by weight of a dispersing agent such as finely divided aluminum oxide, heating the mixture to a temperature of from Tm-25° C. to Tm-5° C. (in which Tm is the temperature at which the melting of the resin particles ends) without heating it above Tm, opening one end of the vessel, releasing the resin particles and water into an atmosphere at a lower pressure than the inside of the vessel, and thus preliminarily foaming the resin particles.

Tm is determined as follows:

By using a differential scanning calorimeter, a sample (6 to 8 mg) is heated to 220° C. at a rate of 10° C./min., then cooled to about 40° C. at a rate of 10° C./min., and again heated to 220° C. at a rate of 10° C./min. In the DSC curve obtained by the second temperature elevation, the point where the bottom line of the endothermic peak meets the base line is defined as Tm.

As stated above, the preliminarily foamed particles of the polypropylene-type resin showing a high temperature peak in the DSC curve can be obtained by not heating the particles above the melting termination temperature Tm in preliminary foaming but restricting the foaming temperature to the above-specified temperature range. If the foaming temperature falls outside the above range, or if it is within the above range but has once been raised above Tm, only the inherent peak appears in the DSC curve of the preliminarily foamed particles, and no high temperature peak appears.

The preliminarily foamed particles of this invention are used alone as a material for fabrication in a mold. But as required, they may be mixed in a suitable proportion with conventional preliminarily foamed particles of polypropylene-type resins, and the mixture is used as a material for fabrication in a mold. In other words, the preliminarily foamed particles of the invention may also be used as a modifier for in-mold articles from conventional preliminarily foamed particles of polypropylene-type resins.

As stated hereinabove, the preliminarily foamed particles of polypropylene-type resins of this invention are characterized by the fact that (1) an alpha-olefin/propylene random copolymer having an amount of the heat of crystallization, measured by differential scanning calorimetry, of 5 to 15 cal/g is used as a base resin for the preliminarily foamed particles and (2) the preliminarily foamed particles have such a crystal structure that in the DSC curve, a high temperature peak appears on the higher temperature side of the inherent peak of the base resin. Consequently, the preliminarily foamed particles of the polypropylene-type resin of this invention have better moldability at low temperatures than conventional preliminarily foamed particles of polypropylene-type resins and even when molded at low temperatures, easily give molded articles of a low density (a high expansion ratio). Furthermore, the preliminarily foamed particles of this invention can give in-mold articles having lower shrinkage and water absorption and higher suppleness and impact strength than those obtained from the conventional preliminarily foamed particles of polypropylene-type resins.

When the preliminarily foamed particles of this invention are mixed in a suitable proportion with the conventional preliminarily foamed particles of polypropylene-type resins, the mixture can be molded easily at lower temperatures than the conventional preliminarily foamed particles alone. In addition, by changing the mixing proportion, an in-mold article having suppleness intermediate between that of an in-mold article produced from the preliminarily foamed particles of the invention alone and that of an in-mold article produced from the conventional preliminarily foamed particles of polypropylene-type resin alone. Hence, according to the purposes of use and applications, in-mold articles having various levels of suppleness can be easily produced.

The following Examples and Comparative Examples illustrate the present invention more specifically.

EXAMPLES 1 TO 4 AND COMPARATIVE EXAMPLES 1 TO 4

A 5-liter autoclave was charged with 3000 g of water, 1000 g of particles of each of the copolymers (base resins) indicated in Table 1, 3 g of ultrafine aluminum oxide (dispersant) and 160 g of dichlorodifluoromethane as a blowing agent, and they were heated with stirring. After the mixture attained the maximum temperature shown in Table 1, it was maintained at the foaming temperature indicated in Table 1. Then, while the inside pressure of the autoclave was maintained at 30 kg/cm$^2$ (G) by a nitrogen gas, one end of the autoclave was opened, and the copolymer particles and water were simultaneously released into an outer atmosphere under atmospheric pressure to foam the copolymer particles. Thus, preliminarily foamed particles were obtained. The apparent expansion ratio of the resulting preliminarily foamed particles is shown in Table 1.

The resulting preliminarily foamed particles were subjected to differential scanning calorimetry by using a differential scanning calorimeter by heating them to 220° C. at a rate of 10° C./min., and a first DSC curve of the preliminarily foamed particles was drawn. Then, the particles were cooled to 50° C. at a rate of 10° C./min., and again heated to 220° C. at a rate of 10° C./min. by the same differential scanning calorimetry and a second DSC curve was obtained. The presence or absence of a high temperature peak in these DSC curves was observed. With respect to those preliminarily foamed particles which showed a high temperature peak in the first DSC curve, the difference ($\Delta t$) between the temperature of the high temperature peak and the temperature of the inherent peak appearing in the second DSC curve was determined. The results are shown in Table 1.

Figure 2:
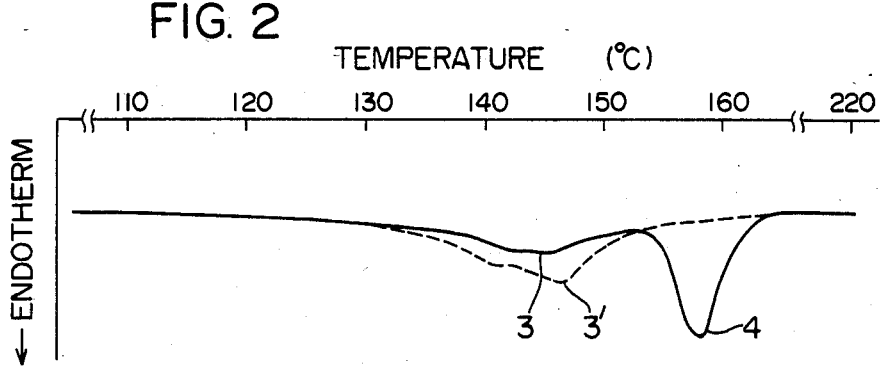
FIG. 2 is a graph showing the DSC curve of the preliminarily foamed particles obtained in Example 1.
Figure 3:
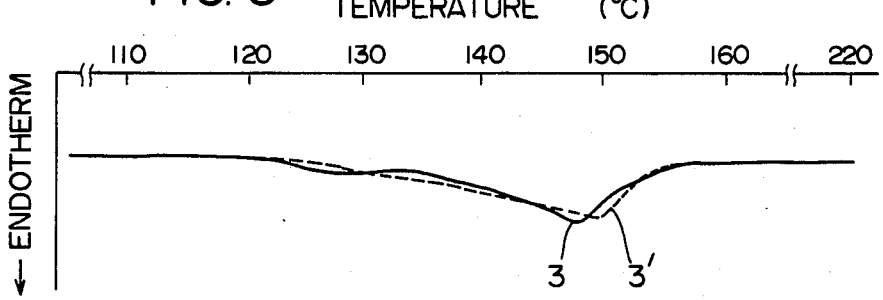
FIG. 3 is a graph showing the DSC curve of the preliminarily foamed particles obtained in Comparative Example 3.

The DSC curves of the preliminarily foamed particles obtained in Example 1 are shown in FIG. 2, and the DSC curves of the preliminarily foamed particles obtained in Comparative Example 3 are shown in FIG. 3. In FIGS. 2 and 3, the solid lines show the first DSC curves; the dotted lines, the second DSC curves; 3,3', the inherent peak; and 4, the high temperature peak.

The preliminarily foamed particles were pressurized with air under 3 kg/cm$^2$ (G) to apply an internal pressure of 1.5 kg/cm$^2$ (G), and then filled in a mold for a flat plate (with an inside size of 50 mm × 300 mm × 300 mm), and heated by steam to form an in-mold article. The lowest vapor pressure at which molding was possible is shown in Table 1. The resulting in-mold article was dried in an oven at 60° C. for 24 hours, and then cooled to room temperature. The various properties of the molded article were measured. The results are also shown in Table 1.

EXAMPLES 5 TO 12

The preliminarily foamed particles obtained in each of Examples 1 to 4 were mixed with the preliminarily foamed particles obtained in Comparative Example 4 in each of the ratios shown in Tables 2 and 3. The mixture was filled in the same mold as used in the preceding examples, and heated by steam to form an in-mold article. The lowest vapor pressure at which molding was possible was determined. The in-mold article was dried in an oven at 60° C. for 24 hours, and its various properties were measured. The results are also shown in Tables 2 and 3.

TABLE 1

| | Base resin | | | Foaming conditions | | Preliminarily foamed particles | | |
|---|---|---|---|---|---|---|---|---|
| | Type | Heat of crystallization (cal/g) | Tm (°C.) | Maximum temperature (°C.) | Foaming temperature (°C.) | Apparent expansion ratio | High temperature peak | $\Delta_t$ (°C.) |
| Example | | | | | | | | |
| 1 | 1-Butene/propylene random copolymer (vanadium-containing catalyst) | 5.5 | 152 | 145 | 145 | 31 | Yes | 15 |
| 2 | 1-Butene/propylene random copolymer (vanadium-containing catalyst) | 12.2 | 155 | 145 | 145 | 31 | Yes | 13 |
| 3 | 1-Butene/propylene random copolymer (vanadium-containing catalyst) | 13.5 | 156 | 145 | 145 | 30 | Yes | 14 |
| 4 | 1-Butene/propylene random copolymer (vanadium-containing catalyst) | 14.8 | 157 | 145 | 145 | 30 | Yes | 15 |
| Comparative Example | | | | | | | | |
| 1 | 1-Butene/propylene random copolymer (vanadium-containing catalyst) | 4.5 | 152 | 155 | 145 | 33 | No | — |
| 2 | 1-Butene/propylene random copolymer (vanadium-containing catalyst) | 16.5 | 157 | 145 | 145 | 30 | Yes | 14 |
| 3 | 1-Butene/propylene random copolymer (vanadium-containing catalyst) | 12.2 | 155 | 155 | 145 | 35 | No | — |
| 4 | Ethylene-propylene random copolymer (titanium-containing catalyst) | 16.7 | 153 | 145 | 130 | 30 | Yes | 15 |

Properties of the molded article

Lowest Dimensional

TABLE 1-continued

| | Base resin | moldable vapor pressure (kg/cm² (G)) | Expansion ratio | Shrinkage (*1) | Water absorption (*2) | change upon heating (*3) | Suppleness (*4) | Impact strength (*5) | Overall evaluation |
|---|---|---|---|---|---|---|---|---|---|
| Example | | | | | | | | | |
| 1 | 1-Butene/propylene random copolymer (vanadium-containing catalyst) | 1.8 | 30 | 0 | below 0.003 g/cm³ | 0 | 0 | 0 | 0 |
| 2 | 1-Butene/propylene random copolymer (vanadium-containing catalyst) | 2.2 | 30 | 0 | below 0.003 g/cm³ | 0 | 0 | 0 | 0 |
| 3 | 1-Butene/propylene random copolymer (vanadium-containing catalyst) | 2.4 | 29 | 0 | below 0.003 g/cm³ | 0 | 0 | 0 | 0 |
| 4 | 1-Butene/propylene random copolymer (vanadium-containing catalyst) | 2.5 | 29 | 0 | below 0.003 g/cm³ | 0 | 0 | 0 | 0 |
| Comparative Example | | | | | | | | | |
| 1 | 1-Butene/propylene random copolymer (vanadium-containing catalyst) | 1.7 | 26 | X | at least 0.03 g/cm³ | 0 | 0 | 0 | X |
| 2 | 1-Butene/propylene random copolymer (vanadium-containing catalyst) | 2.6 | 29 | 0 | below 0.003 g/cm³ | 0 | X | Δ | X |
| 3 | 1-Butene/propylene random copolymer (vanadium-containing catalyst) | 2.2 | 28 | X | at least 0.03 g/cm³ | 0 | 0 | 0 | X |
| 4 | Ethylene-propylene random Copolymer (titanium-containing catalyst) | 3.2 | 24 | 0 | below 0.003 g/cm³ | 0 | X | X | X |

TABLE 2

| | Preliminarily foamed particles | | Lowest moldable vapor pressure (kg/cm² (G)) | Properties of the molded article | | | | | | |
|---|---|---|---|---|---|---|---|---|---|---|
| Example | Type | Mixing ratio (Vol. %) | | Expansion ratio | Shrinkage (*1) | Water absorption (*2) | Dimensional change upon heating (*3) | Suppleness (*4) | Impact strength (*5) | Overall evaluation |
| 5 | Those obtained in Example 1 | 66 | 1.8 | 30 | 0 | below 0.003 g/cm³ | 0 | 0 | 0 | 0 |
| | Those obtained in Comparative Example 4 | 34 | | | | | | | | |
| 6 | Those obtained in Example 2 | 66 | 2.2 | 30 | 0 | below 0.003 g/cm³ | 0 | 0 | 0 | 0 |
| | Those obtained in Comparative Example 4 | 34 | | | | | | | | |
| 7 | Those obtained in Example 3 | 75 | 2.4 | 29 | 0 | below 0.003 g/cm³ | 0 | 0 | 0 | 0 |
| | Those obtained in Comparative Example 4 | 25 | | | | | | | | |
| 8 | Those obtained in Example 4 | 70 | 2.7 | 29 | 0 | below 0.003 g/cm³ | 0 | 0 | 0 | 0 |
| | Those obtained in Comparative Example 4 | 30 | | | | | | | | |

TABLE 3

| | Preliminarily foamed particles | | Lowest moldable vapor pressure (kg/cm² (G)) | Properties of the molded article | | | | |
|---|---|---|---|---|---|---|---|---|
| Example | Type | Mixing ratio (Vol. %) | | Expansion ratio | Shrinkage (*1) | Water absorption (*2) | Dimensional change upon heating (*3) | Overall evaluation |
| 9 | Those obtained in Example 1 | 34 | 3.2 | 29 | 0 | 0 | 0 | 0 |
| | Those obtained in Comparative Example 4 | 66 | | | | | | |
| 10 | Those obtained in Example 2 | 34 | 3.2 | 29 | 0 | 0 | 0 | 0 |
| | Those obtained in Comparative Example 4 | 66 | | | | | | |
| 11 | Those obtained in Example 3 | 25 | 3.4 | 29 | 0 | 0 | 0 | 0 |

TABLE 3-continued

| Example | Preliminarily foamed particles Type | Mixing ratio (Vol. %) | Lowest moldable vapor pressure (kg/cm² (G)) | Properties of the molded article | | | | |
|---|---|---|---|---|---|---|---|---|
| | | | | Expansion ratio | Shrinkage (*1) | Water absorption (*2) | Dimensional change upon heating (*3) | Overall evaluation |
| 12 | Those obtained in Comparative Example 4 | 75 | 3.2 | 29 | 0 | 0 | 0 | 0 |
| | Those obtained in Example 4 | 30 | | | | | | |
| | Those obtained in Comparative Example 4 | 70 | | | | | | |

The properties of the in-mold article indicated in the tables were measured and evaluated by the following methods.

(*1): The percentage decrease of the size of the in-mold article in the planar direction based on the size of the mold was calculated, and the results were evaluated by the following scale.

0: the percent decrease was less than 3%.
X: the percent decrease was at least 3%.

(*2): Measured in accordance with the method of JIS K-6767B.

(*3): In a square sample of the in-mold article, with one side measuring 150 mm, a square (100 mm × 100 mm) and crossing lines meeting at the center of the square were drawn. The length of each line segment from the center of the square to the point where the crossing lines met the square was precisely measured. The sample was then left to stand for 22 hours in a constant temperature vessel kept at 90±1° C., and allowed to cool at 25° C. for 1 hour. The length of each line segment was precisely measured, and the percent change from the original length was calculated. By the average value of the percent changes of the line segments, the dimensional change upon heating was evaluated as follows:

0: less than 4% (no problem in practical applications)
X: at least 4% (could not withstand use)

(*4): A rectangular sample, 20 mm in thickness, 300 mm in length and 40 mm in width, was bent in a direction in which the two 40 mm wide edges of the sample 300 mm apart from each other contacted each other, and its suppleness was evaluated on the following scale.

0: The sample did not break when it was completely bent in two.
Δ: The sample did not break when it was bent until the two edges contacted each other.
X: The sample broke before the two edges contacted.

(*5): A disc having a weight of 5 kg and a diameter of 155 mm was let fall horizontally onto the surface of a sample, 50 mm thick, 300 mm long and 300 mm wide, from a height of 1 m, and the degree of breakage of the sample was observed and evaluated on the following scale.

0: The breakage measured less than 10 cm (1/5 of the circumference of the disc).
Δ: The breakage measured at least 10 cm to less than 25 cm (½ of the circumference of the disc).
X: The breakage measured at least 25 cm.

What is claimed is:

1. Preliminarily foamed particles of a non-crosslinked polypropylene resin based on an alpha-olefin having 4 to 6 carbon atoms/propylene random copolymer having an amount of the heat of crystallization in the range of 5 to 15 cal/g, said preliminarily foamed particles having such a crystal structure that when a DSC curve is drawn by heating 1 to 3 mg of the preliminarily foamed particles to 220° C. at a rate of 10° C./min. by means of a differential scanning calorimeter, a high temperature peak is observed at a higher temperature than the temperature of the peak inherent to the base resin.

2. The preliminarily foamed particles of claim 1 wherein the difference between the temperature of the inherent peak of the base resin and the temperature of the high temperature peak is at least 5° C.

3. The preliminarily foamed particles of claim 1 wherein the alpha-olefin is 1-butene, 1-pentene, or 1-hexene.

4. The preliminarily foamed particles of claim 1 wherein the alpha-olefin/propylene random copolymer is a 1-butene/propylene random copolymer in which the proportion of 1-butene in the copolymer is from about 15 to 40 mole%.

5. An in-mold article obtained by foaming the preliminarily foamed particles of claim 1 in a mold under heat.

* * * * *